United States Patent [19]

Baker et al.

[11] Patent Number: 4,600,525
[45] Date of Patent: Jul. 15, 1986

[54] HYDROGEN SORBENT FLOW AID COMPOSITION AND CONTAINMENT THEREOF

[76] Inventors: Nathaniel R. Baker, 748 Cook St., Denver, Colo. 80206; Franklin E. Lynch, Rte. 1, Box 574, Conifer, Colo. 80433

[21] Appl. No.: 400,440

[22] Filed: Jul. 21, 1982

[51] Int. Cl.⁴ ............................................. C01B 31/16
[52] U.S. Cl. .................................... 252/184; 206/0.6; 206/0.7; 423/648 R
[58] Field of Search .................... 252/184; 48/196; 206/0.6, 0.7; 423/648 R

[56] References Cited

U.S. PATENT DOCUMENTS 4,385,019  5/1983  Bernstein et al. ............... 252/181.2
4,433,063  2/1984  Bernstein et al. .................. 502/101

Primary Examiner—Stephen J. Lechert, Jr.
Attorney, Agent, or Firm—Burton, Dorr & Carson

[57] ABSTRACT

A sorbent composition for reducing the stress buildup within sorbent alloys such as hydride powders being used to store hydrogen gas by imparting more of a fluid-like property to the alloys. Under the teachings of the present invention, a second powder is added to the powdered sorbent alloy to serve as a flow aid to the alloy powders so as to allow rearrangement and movement for the alloy powders with respect to each other and with respect to the sidewalls of the container. The flow aid powder which is chemically inert with respect to hydrogen and the sorbent alloys is mixed with the sorbent alloy powder and the amount of the flow aid powder is dependent upon the volume change of the particular hydride, the strength of the container, the geometry of the container, the orientation of the container, and the direction of the reaction front. The addition of the flow aid reduces densification, compaction, settling, and stress buildup during successive cycles of absorption and desorption.

14 Claims, 6 Drawing Figures

HYDROGEN SORBENT FLOW AID COMPOSITION AND CONTAINMENT THEREOF

FIELD OF THE INVENTION

The invention is in the field of powders which react reversibly with a gas, and undergo volume changes during this reaction and, more particularly, the field of metal hydrides which absorb and desorb hydrogen gas.

BACKGROUND OF THE ART

Hydrogen is the most abundant of all elements and is an important ingredient in many industrial processes. Hydrogen also has potential to be a synthetic fuel for a variety of purposes traditionally served by petroleum. One of the chief difficulties, however, in using hydrogen for present or future fuel purposes is its storage in high pressure or in insulated tanks. As the least dense substance known, hydrogen requires large volumes, high pressures (such as 2000 psi) or both when conventionally stored. Regardless of how much pressure is applied, hydrogen will not liquify as will some gases, e.g., propane. Hydrogen only becomes a liquid at temperatures below $-253°$ C. ($-423°$ F.) and in order to contain this ultra-cold liquid for any reasonable period of time, super-insulated containers are required.

Hydrogen at low pressures can also be stored compactly in metal containers at moderate pressures and normal temperatures when it is chemically absorbed into certain powdered sorbent alloys which are conventionally known to form "metal hydrides". Typically, these powdered hydrides are less than five microns in size and are highly irregular in shape being jagged and having crevices.

These powdered materials, e.g., FeTi or $LaNi_5$ absorb (through an exothermic process) and release (through an endothermic process) hydrogen gas at pressures typically less than 1 MPa (150 psi) and at normal room temperatures, e.g., 20° C. (68° F.). During the absorption process the irregular shaped sorbent alloys expand by about 15-25% in volume, in much the same way as water changing to ice expands, and the alloys are capable of straining and bursting any container, by exerting solid pressures of at least 5000 psi, unless the container is designed to allow for this type of expansion. The stress from the metal hydrides is cumulative and grows over a number of absorption-desorption cycles to first deform, then bulge, and to finally burst the container. When this occurs a dangerous condition arises through the expulsion of fine pyrophoric powders in a flammable gas.

A metal hydride container usually incorporates means for rapidly transferring heat into and out of the metal hydrides. Heat is generated as the alloy absorbs and reacts with hydrogen. Heat must be added in order to release the hydrogen from the alloy. Unfortunately, most conventional designs for heat exchangers are not acceptable because either they (1) fail to allow for the expansion of the hydride powders or (2) they actually aggravate this problem. Tubes, fins, plates and the like which are the tools of heat transfer, can cause special problems inside hydride containers by impeding the motion of the powder as it expands during absorption of hydrogen. These objects may be strained, displaced or broken by the virtually irresistable forces from the expanding hydride.

As mentioned, hydride particles have no definable shape and their outside surface is characterized by jagged fractures in random directions. Therefore, movement and rearrangement of the powder is limited by the natural interlocking tendency of the hard, brittle particles. In other words, the particles lock together and exhibit poor flow characteristics.

The motion and rearrangement of the powder as it expands is further impeded by the problem of powder compaction, which is a result of spatially non-homogeneous reactions. Within a mass of hydride powders, the absorption of hydrogen is governed by the applied hydrogen pressure and temperature of the metal particles. Since metal hydrides are typically fine powders, gas flow within a volume of powders is restricted. In addition, metal hydrides are generally poor conductors of heat; thus, particles farthest from the heat-sink will have a limited ability to release heat and will react more slowly than those particles nearest the heat sink.

The result of either of the above will be the appearance of one or more reaction fronts which move through the powder with a definable direction. Those particles which are first to absorb hydrogen will tend to expand in the direction of least resistance within the container. Subsequent movement towards open space is impeded by inter-particle friction, gravity and by any obstructions such as fins or tubes inside the container. The expanding powder will also tend to compact those particles not yet reacted, i.e., the powder preceding the reaction front.

Associated with this powder compaction is the change in the bulk density. Those particles among the last to react will be subjected to high compacting pressures which aggravate the particle interlocking process. Within the hydride container, the last powders to react are both densified and impeded from rearranging themselves. Expansion of this powder may result in straining of the container walls.

As the hydrides desorb hydrogen, the particles contract, and any residual compacting pressure will only be due to the effect of gravity, which is small. However, and more importantly, the density gradients which occurred during the absorption of hydrogen may remain even after all the hydrides have desorbed gas. Successive absorption-desorption cycles can lead to a cumulative densification problem, which in turn causes a growth in area and force applied to the container walls and eventually, possible bursting of the container.

Because of these stress characteristics of sorbent alloys, care must be taken in the internal placement of heat transfer and gas dispersion devices in the storage container.

In U.S. Pat. No. 4,036,944, entitled "Hydrogen Sorbent Composition and Its Use", the combination of a metal hydride such as the alloy lanthanum pentanickel ($LaNi_5$) with a thermal plastic elastomer binder is set forth. In the preferred embodiment, 2-15% by weight binder and 98-85% by weight sorbent (i.e., metal hydride) is utilized. Particles of the sorbent and binder are co-mingled, heated to the softening point of the binder, and molded into pellets. It was found in the U.S. Pat. No. '944 patent that the resulting pellet did not diminish the capacity of the sorbent to absorb and desorb hydrogen. In one embodiment wherein the pellets were 97% by weight $LaNi_5$ and 3% by weight binder, a reduction in the attrition (i.e., disintegration of the particles into smaller sizes) was significantly reduced over using simply the sorbent particles.

In U.S. Pat. No. 4,135,621 issued to Turillon et al and entitled "Hydrogen Storage Module", a horizontal storage container is disclosed having a number of flutes formed around the circumference of an elongated metal cylinder to enhance heat transfer, and to aid in stacking, and wherein the ends are crimped over a gas-permeable filter disk. The interior of the cylinder is filled to a volume no greater than 78% of the total volume with a metal hydride.

In U.S. Pat. No. 4,134,491 issued to Turillon et al and entitled "Hydride Storage Containment", the invention teaches the use of at least one collapsible structure wtihin the hydrogen storage container wherein the collapsible structure may be permeable to hydrogen gas but impermeable to solids such as the hydrides. In the preferred embodiments of that invention, an elongated cylinder having a number of holes formed in the cylinder is utilized, a number of hollow capsules, spheres, or the like may be intermixed with the metal hydrides, or a number of foam-like objects such as cubes can be dispersed throughout the powder. These collapsible structures are used, preferably near the bottom of the container where densification is the greatest to aid in minimizing the deformation of the container after a number of cycles.

In U.S. Pat. No. 4,134,490 issued to Turillon et al and entitled "Gas Storage Containment", crumpled pieces of metal foil or fragmented turnings are intermixed with the metal sorbents in order to provide free space for expansion of the metal absorbents. Again, the expressed purpose for adding such second particulates is to minimize the expansion and possible rupture problem caused by the metal hydrides.

In U.S. Pat. No. 4,133,426 issued to Turillon et al and entitled "Hydride Container", a number of small storage capsules are utilized to store the metal sorbents. Each storage capsule has at least one end in communciation through a porous filter so that hydrogen gas can enter and leave the capsule. In the preferred operation, a large number of these individual storage capsules are then stacked inside a larger hydrogen storage unit. In the preferred embodiment, each capsule is 76.2 mm long and 12.2 mm in outside diameter having an internal volume of 9 cc. Again, these smaller cylinders are to be stacked in a horizontal position to minimize the compaction problem by maximizing the free gas space above the hydrides.

As can be witnessed from the above, the crux of the problem pertains to the limited ability of the sorbent material to flow or move within the container during expansion, and after contraction to relieve densification gradients. Within the field of material handling, the addition of "flow-aids" such as "lubricant" to powders to enhance their flow through, for example, bins, is well known. It has now been discovered that in the present invention the addition of a lubricant significantly reduces the results of expansion of hydrides in storage containers.

SUMMARY OF THE INVENTION

A primary problem in using sorbent alloys such as hydride powders to store hydrogen gas, is the increase in volume exhibited by the powders during absorption which, after successive cycles, cumulatively compacts and densifies the sorbent alloys ahead of the absorption reaction front resulting in large pressures, such as 5000 psi, on the sidewalls of the container. Such pressures can permanently deform and possibly rupture the container and are a result of the inability of the hydrides to flow or move about in the container.

The present invention reduces the stress buildup within the sorbent alloys by imparting more of a fluid-like property to the alloys. Under the teachings of the present invention, a second powder is added to the powdered sorbent alloy to serve as a flow aid to the alloy powders so as to allow rearrangement and movement for the alloy powders with respect to each other and with respect to the sidewalls of the container. The flow aid powder is mixed with the sorbent alloy powder and the amount of the flow aid powder is dependent upon the volume change of the particular hydride, the strength of the container, the geometry of the container, the orientation of the container, and the direction of the reaction front. The addition of the flow aid reduces densification, compaction, settling, and stress buildup during successive cycles of absorption and desorption. And, the flow aid powder is chemically inert with respect to hydrogen and to the sorbent alloys.

DESCRIPTION OF THE DRAWING

FIG. 1 shows a prior art horizontal pressure vessel 10 having a conventional valve 20 and a conventional port 30. Interior of the conventional pressure vessel or storage container 10 is found a sorbent alloy 100. The sorbent alloy 100 occupies approximately 60–75% of the total volume, leaving a free space 110 above the alloy. Typically, the pressure vessel 10 is made from Austenitic Stainless steel, copper or aluminum alloy, and the valve 20 can be any of a number of conventional inlet and outlet valves which has some filter 40 to prevent sorbent alloy 100 from escaping from the containter.

It is well known that lanthanum pentanickle (LaNi$_5$), as a hydrogen sorbent alloy, exhibits greater expansion characteristics upon absorbing hydrogen than some other sorbent alloys. Hence, this sorbent alloy was chosen, as a basis for tests which demonstrate the advantages of the present invention.

The sorbent composition 100 of the present invention, therefore, utilized HY-STOR metal hydride of LaNi$_5$ (Heat No. T-83774) available from Ergenics, Division of MPD Technology Corp., 681 Lawlins Road, Wyckoff, N.J. 07481. As set forth in U.S. Pat. No. 4,134,490, this type of sorbent is jagged with large spikes and deep crevices and is highly irregular in shape. To this mixture is added, about 10% by weight, or 30% by volume, a powder which imparts to the mixture more of a flow property, such as flurocarbon lubricants similar to DuPont TEFLON 7A or fluorocarbon elastomers such as DuPont VITON.

In one preferred embodiment, DuPont TEFLON 7A is utilized and it is to be noted that the commercial use of 7A TEFLON is an injection molding material. DuPont TEFLON 7A is a granular TFE - flurocarbon resin having a bulk density of 475 g/l and a specific gravity of about 2.2. This TEFLON is composed of generally five micron diameter beads in approximate spherical shape and is believed to serve primarily as a lubricant to the sorbent alloys. Hence, the lubricant is of the approximate size of the metal sorbent.

In a second preferred embodiment VITON powder is utilized and the commercial use of VITON is in O-Ring Sealers because of its elasticity properties. The use of VITON with sorbent alloys to increase flow is believed to be a result of both the lubrication and resiliency which VITON imparts to the otherwise abrasive and inelastic powdered material. These flow aid particles are approximatley in the same order of magnitude in size as the size of the sorbent alloy particles.

Figure 1:
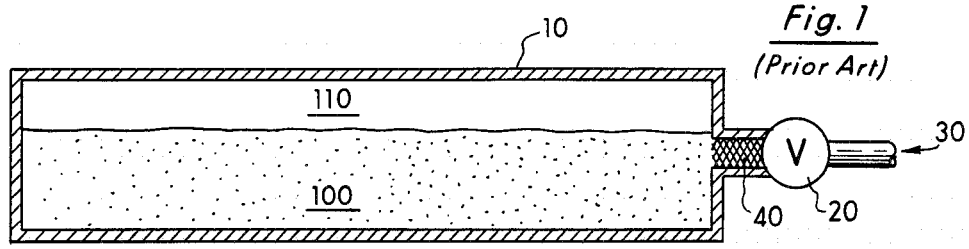
FIG. 1 sets forth, in illustration, a prior art hydrogen storage container.

In a long narrow storage container 10 such as that shown in FIG. 1, when hydrogen gas is absorbed during each cycle, the sorbent 100 is free to move towards the free gas space 110 above. Under such a configuration, there are no density gradients throughout the sorbent bed.

Figure 2:
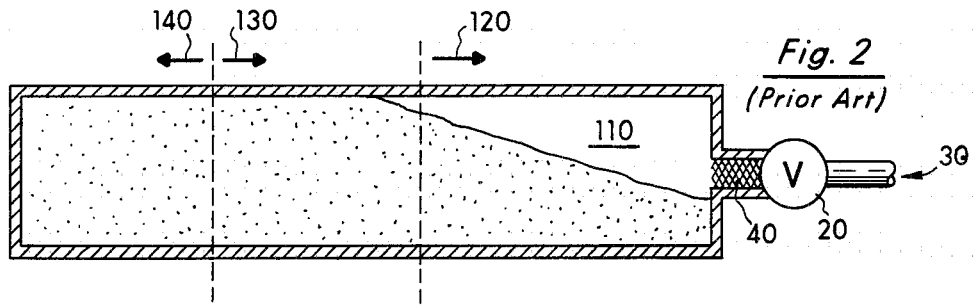
FIG. 2 sets forth, in illustration, a prior art hydrogen storage container wherein the sorbent is maldistributed.

Under repeated usage, the idealized situation, represented in FIG. 1, may change to the situation represented in FIG. 2. Such a movement of sorbent alloy can be caused by a variety of reasons, such as, gas conveying of particles, vibration, temporary or permanent tilting of container 10 from the horizontal orientation, etc. As gas is admitted through Valve 20 and filter 40, and the reaction front moves to the left in FIG. 2, the sorbents in region 120 expand towards the free space 110. Within region 130, the expansion of the sorbent can be accommodated for in two ways. First, those expanding sorbent particles nearest to any remaining free space 110 may have sufficient force to move towards regin 120. At some distance away from any free space 110, the second expansion accommodation effect becomes crucial. Since movement towards free space is prevented by the mass of hydride, sorbent expansion within space 130 causes a compaction within region 140. The net result of the reaction front moving from region 120 to region 140 is a densification in region 140. As the sorbent in region 140 expands, container strain will occur.

Figure 3:
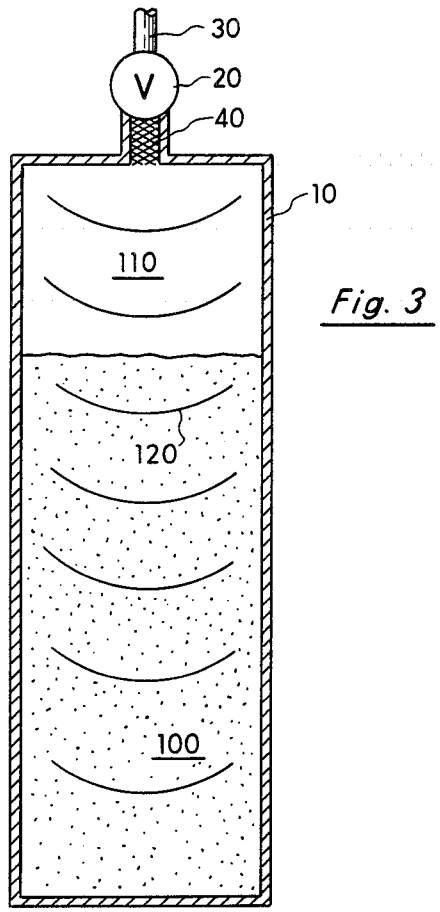
FIG. 3 sets forth the prior art container of FIG. 1 oriented in a vertical direction.

If conventional sorbent alloys are oriented in the storage container 10 as shown in FIG. 3, then the densification of the sorbents at the bottom of the container is greatly magnified through the combined effect of gravity, the lack of available expansion space directly above the sorbent material, and the reaction front. In other words, if conventional sorbent alloys are added to the container orientation shown in FIG. 3, rupturing would occur at or near the bottom of the container 10 after a few cycles. See "The Role of Metal Hydrides in Hydrogen Storage and Utilization", Proc. 2nd World Hydrogen Energy Conference, Zurich, Switzerland, August 1978, Pergamon Press, Pages 1475-1524.

Hence, in conventional cyclindrical hydride container design, the container is oriented horizontally and has a ratio of length to diameter in the range of about one to ten and preferably in the range of about one to six. (See U.S. Pat. No. 4,135,621) This type of orientation provides an amount of free space 110 above the dispersed sorbent alloys 100. Hence, the orientation of FIG. 3 would represent a worst case orientation and configuration, especially if the length to diameter ratio exceeds six to one. It would be expected that after only a few cycles of absorption-desorption the vertically oriented container 10 would rupture at or near the bottom. Furthermore, if the container 10 were made from a material with poor elongation properties, the rupturing event would occur much earlier in the cycling with little accumulated strain.

Therefore, an experiment was conducted in order to illustrate the advantages of adding a flow aid powder of the present invention to the sorbent alloy in a mixture. A severe test configuration used the highly expansive sorbent alloy $LaNi_5$, the vertical orientation of the container shown in FIG. 3, a container having a length to diameter ratio exceeding six to one, and a container constructed from copper so as to permit measurable strain prior to rupture.

FIRST EXAMPLE

In this example, the $LaNi_5$ sorbent alloy was ground to minus 100 mesh and was mixed with type 7A TEFLON powder with a mortar and pestle. Three separate compositions were formed. In the first composition, there were 75 grams of pure $LaNi_5$ without any TEFLON (hence, zero percent by weight TEFLON). In the second composition, to 75 grams of $LaNi_5$, 5% by weight, TEFLON was added. And, in the third composition, to 75 grams of $LaNi_5$, 10%, by weight, Teflon was added. Each composition was added to separate copper containers (15.9 mm. dia. by 0.9 mm wall thickness). The tubes were about 225 mm long. Each tube was oriented vertically and the tubes were marked at 2 cm intervals. The outside diameter of each tube was measured at the 2 cm intervals prior to cycling and again after cycling. Each of the three tubes were then cycled with hydrogen in the vertical position in a 25° C. water bath. A strain gauge, oriented for circumferential strain, was cemented at the four centimeter position (from the bottom) on each tube. After initial activation at 2.08 MPa (300 psia), samples were charged either at 0.41 MPa (60 psia) or 1.03 MPa (150 psia). Discharging was against atmospheric pressure. The first ten cycles were performed without vibrating the specimen. Each additional cycle from that point on was vibrated in the discharged state to promote settling (densification).

Figure 4:
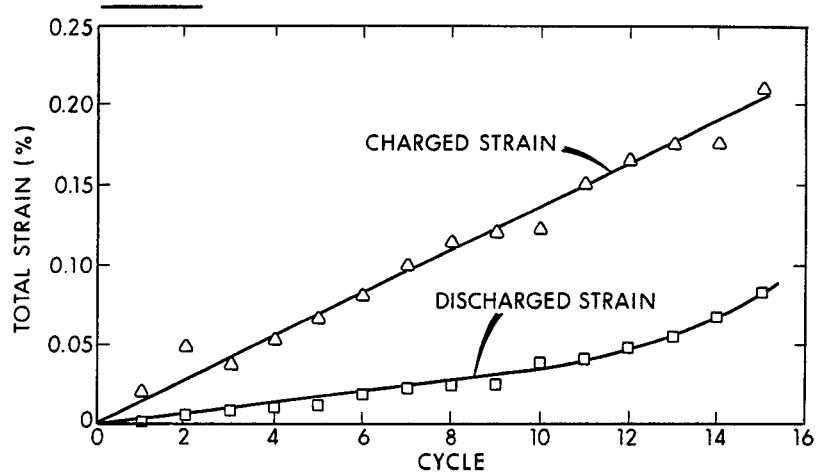
FIG. 4 is a graphical representation showing the strain experienced on the container of FIG. 3 for each absorption-desorption cycle for a mixture containing pure hydrogen sorbent alloy.
Figure 5:
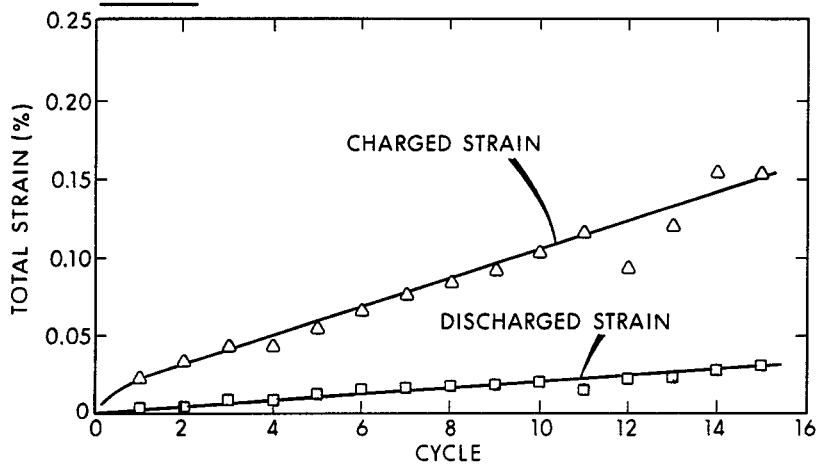
FIG. 5 is a graphical representation showing the strain experienced on the container of FIG. 3 for each absorption-desorption cycle for a mixture containing pure hydrogen sorbent composition containing 5%, by weight, flow aid.
Figure 6:
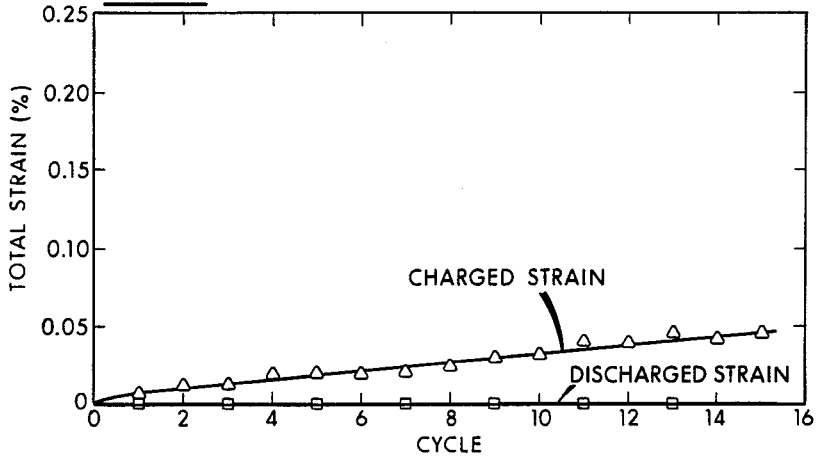
FIG. 6 is a graphical representation showing the strain experienced on the container of FIG. 3 for each absorption-desorption cycle for a mixture containing pure hydrogen sorbent composition containing 10%, by weight, flow aid.

FIGS. 4, 5 and 6 graphically show the results of the example. In FIG. 4, which represents the case of no flow aid in the composition (i.e., 0% TEFLON), the measured strain is set forth. With each cycle, as the sorbent alloys become charged with hydrogen, the outer diameter of the tube grows (termed "charged strain"). With each cycle, as the hydrogen is discharged and the sorbent alloys contract, the tube also contracts but retains a residual deformity called the "discharged strain". Both the charged strain and the discharged strain grows with each cycle.

In FIG. 5, when 5%, by weight, TEFLON is added as a flow aid to the sorbent, the container continues to undergo a charged strain and a discharged strain but of a lesser magnitude than that of FIG. 4. In FIG. 6, the addition of 10%, by weight, of Teflon to the sorbent significantly reduces the charged strain and does not result in any observed cumulative growth in the discharged strain. The charged strain has been reduced at least by an order of magnitude after 14 cycles. Furthermore, with 10% TEFLON added, no plastic deformation or permanent set of the tube occurred. However, after 30 cycles the bottom of the tube ruptured.

SECOND EXAMPLE

In a second example, an extremely thin-walled aluminum cylinder one-half inch in diameter and 18 inches long with a wall thickness of 0.014" was utilized in a vertical orientation. In a first test with only LaNi$_5$ utilized (0% TEFLON), and with the hydrogen gas being put into the container from the bottom, the container exhibited measurable strain (ca 0.001") on the first cycle and was 0.030" oversize by the 23rd cycle. With the addition of 10%, by weight, Teflon, the container began to show measurable strain but only after 40 cycles and grew by 0.012" by the 73rd cycle. For both tests, the container was vibrated at 60 cycles per second during discharge to promote settling. Hence, an increase of an order of magnitude in the number of cycles before permanent strain was observed through the addition of a flow aid.

THIRD EXAMPLE

In this example, the same aluminum containers as used in the second example were utilized except that the hydrogen gas was inputted and outputted from the top of the container in the vertical position and vibrated by tapping during discharge to promote settling. In this orientation, the pure LaNi$_5$ again ruptured (at 0.030" oversize) the container after three cycles. The addition of 10% by weight TEFLON enabled the cycling to continue to six cycles before a permanent strain of 0.004" was noted.

FOURTH EXAMPLE

In this example, the same vertical aluminum containers as used n the third example were utilized except that no vibration was applied, and a portion of the container was thermally insulated so as to promote the appearance of one or more reaction fronts. The pure LaNi$_5$ caused a measurable permanent strain on the second cycle and the test was terminated after 10 cycles caused a permanent growth of 0.033". With the addition of 10 wt. % powdered Viton ($-100$ mesh), cycling continued to 38 cycles before a permanent growth of 0.002" was noted.

While each of the above four examples represent experimental situations for storing hydrogen gas, it is to be understood that even in such laboratory situations, the addition of a flow aid powder to the sorbent alloys benefits container longevity, significantly. It is to be expressly understood that if the flow aid is combined with the sorbent alloys in using conventional configurations such as shown in FIG. 1 with standard thickness walls, very positive benefits will be realized. For example, with the use of lubricating flow aids, a much larger length to diameter ratio for the container is permissible without concern for strain in a container of a given strength. In addition, the container may be inverted with the valve 120 and the port 30 located at the bottom.

In addition, substantial modifications to the manner in which the hydrogen gas is introduced into the container and the manner in which heat is conducted can be made both of which can be used to reduce the effect of the compacting reaction front.

While the present invention has been described with respect to storage of hydrogen, it is to be expressly understood that the present invention is not limited to storage applications but is also applicable to situations, for whatever purpose, where sorbent alloys are formed and decomposed. Such other applications include but are not limited to hydride compressors, heat pumps, gas purifiers and hydrogen getters. In addition, the invention is not limited to the sorbent alloy, LaNi$_5$ but is applicable to all substances which react to form products with volume changes for any material which includes gases other than hydrogen, liquids and even other solids. For example, the present invention is applicable to processes involving the formation of amines using metal halides as the material reacting with ammonia. Furthermore, the present invention is not to be limited to fluorocarbon lubricants and elastomers but to any additive, whether powdered or liquid, which exhibits similar characteristics and imparts improved flow to the sorbent alloy powders.

Although the present invention has been described in conjunction with preferred embodiments, it is to be understood that modifications and variations thereof may be resorted to without departing from the spirit and scope of the invention, as those skilled in the art will readily understand. Such modification and variations are considered to be within the scope of the invention and the appended claims.

We claim:

1. A hydrogen sorbent composition comprising a mixture of:
   powdered hydrogen sorbent alloy, and
   a flow aid, said powdered flow aid being uniformly mixed with said sorbent alloy, said powdered lubricant being capable of improving the flow characteristics to said sorbent alloy by reducing settling, densification and stress buildup in said hydrogen sorbent alloy.

2. The composition of claim 1 wherein said flow aid contains particles in the same order of magnitude of size as the particle size of said sorbent alloy.

3. The composition of claim 1 wherein said flow aid is a fluorocarbon.

4. A hydrogen sorbent composition comprising a mixture of:
   a powdered hydrogen sorbent alloy, and
   at least one type of powdered fluorocarbon flow aid wherein the particle size of said fluorocarbon flow aid is in the same order in magnitude in size as the particle size of said sorbent alloy.

5. A material sorbent composition comprising a mixture of:
   a first particulate solid for combining with said material, said first particulate solid being capable of changing its volume as it combines with said material, and
   a second particulate solid mixed with said first particulate solid for improving the flow of said first particulate solid, said second particulate solid being capable of imparting fluid-like characteristics to said mixture by reducing densification and stress buildup in said first particulate solid during said volume change.

6. The material sorbent composition of claim 5 wherein the size of the particles of said second particulate solid is of the same order of magnitude in size as the size of the particles of said first particulate solid.

7. A method of lubricating powdered metal hydride particles comprising mixing powdered fluorocarbon particles with said metal hydride particles.

8. The method of claim 7 wherein the powdered fluorocarbon particles comprise DuPont Teflon 7A.

9. The method of claim 7 wherein the powdered fluorocarbon particles comprise DuPont VITON.

10. The method of claim 7 wherein the powdered fluorocarbon particles are less than about 10% by weight of the powdered metal hydride particles and are of the same order of magnitude in size.

11. A method of preventing stress build-up in containers for powdered metal hydride particles caused by progressive compaction of said powdered metal hydrides as they absorb and desorb hydrogen, said method comprising mixing powdered metal hydrides.

12. The method of claim 11 wherein the powdered fluorocarbon particles comprise DuPont Teflon 7A.

13. The method of claim 11 wherein the powdered fluorocarbon particles comprised DuPont VITON.

14. The method of claim 11 wherein the powdered fluorocarbon particles are less than about 10% by weight of the powdered metal hydride particles and are of the same order of magnitude in size.

* * * * *